United States Patent
Vollert et al.

(10) Patent No.: US 8,783,792 B2
(45) Date of Patent: Jul. 22, 2014

(54) ELECTROMECHANICAL BRAKE BOOSTER

(75) Inventors: Herbert Vollert, Vaihingen/Enz (DE); Jochen Mayer, Stuttgart-Botnang (DE)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 12/736,694

(22) PCT Filed: Mar. 10, 2009

(86) PCT No.: PCT/EP2009/052755
§ 371 (c)(1),
(2), (4) Date: Nov. 1, 2010

(87) PCT Pub. No.: WO2009/132882
PCT Pub. Date: Nov. 5, 2009

(65) Prior Publication Data
US 2011/0048874 A1 Mar. 3, 2011

(30) Foreign Application Priority Data
Apr. 30, 2008 (DE) .................. 10 2008 001 522

(51) Int. Cl.
*B60T 8/34* (2006.01)

(52) U.S. Cl.
USPC ........ 303/113.3; 60/545; 303/155; 303/115.2

(58) Field of Classification Search
USPC .......... 303/115.2, 115, 122.05, 114.1, 113.3; 188/196 V, 72.7, 72.8, 156, 152, 162; 91/380; 92/130 R, 131; 74/560, 594.4; 60/545
See application file for complete search history.

(56) References Cited

U.S. PATENT DOCUMENTS

| 4,812,723 | A | | 3/1989 | Shimizu |
| 4,918,921 | A | * | 4/1990 | Leigh-Monstevens et al. 60/545 |
| 5,551,764 | A | * | 9/1996 | Kircher et al. .................... 303/3 |
| 6,220,675 | B1 | * | 4/2001 | Steffes ...................... 303/116.2 |
| 6,634,724 | B2 | * | 10/2003 | Kobayashi et al. ............ 303/155 |
| 7,861,522 | B2 | * | 1/2011 | Obata et al. .................... 60/545 |
| 8,011,184 | B2 | * | 9/2011 | Ohtani et al. ................... 60/545 |
| 8,167,383 | B2 | * | 5/2012 | Nishino et al. .......... 303/122.05 |
| 2002/0158510 | A1 | | 10/2002 | Kobayashi et al. |
| 2005/0253450 | A1 | | 11/2005 | Giering et al. |

FOREIGN PATENT DOCUMENTS

| DE | 10057557 A1 | 12/2001 |
| DE | 10327553 A1 | 1/2005 |
| DE | 102004024404 A1 | 7/2005 |
| DE | 102007016136 A1 | 10/2008 |
| GB | 2 315 527 A | 2/1998 |
| JP | 2006-327587 A | 12/2006 |
| JP | 2007-126032 A2 | 5/2007 |
| RU | 2 157 324 C2 | 10/2000 |
| RU | 2 221 717 C1 | 1/2004 |
| WO | 2004110840 A1 | 12/2004 |

* cited by examiner

*Primary Examiner* — Thomas Irvin
(74) *Attorney, Agent, or Firm* — Maginot, Moore & Beck

(57) ABSTRACT

The invention relates to an electromechanical brake booster with an electric motor and a helical gearing. The brake booster is used for coupling an auxiliary force via a driver into a piston rod. The invention proposes connecting a spindle of the helical gearing elastically via a spring element to the piston rod such that, in the event of rapid actuation of the brake, the helical gearing and a rotor of the electric motor do not have to be accelerated entirely muscle power. The muscle power required for actuating a brake is reduced as a result in the event of a rapid actuation of the brake.

19 Claims, 1 Drawing Sheet

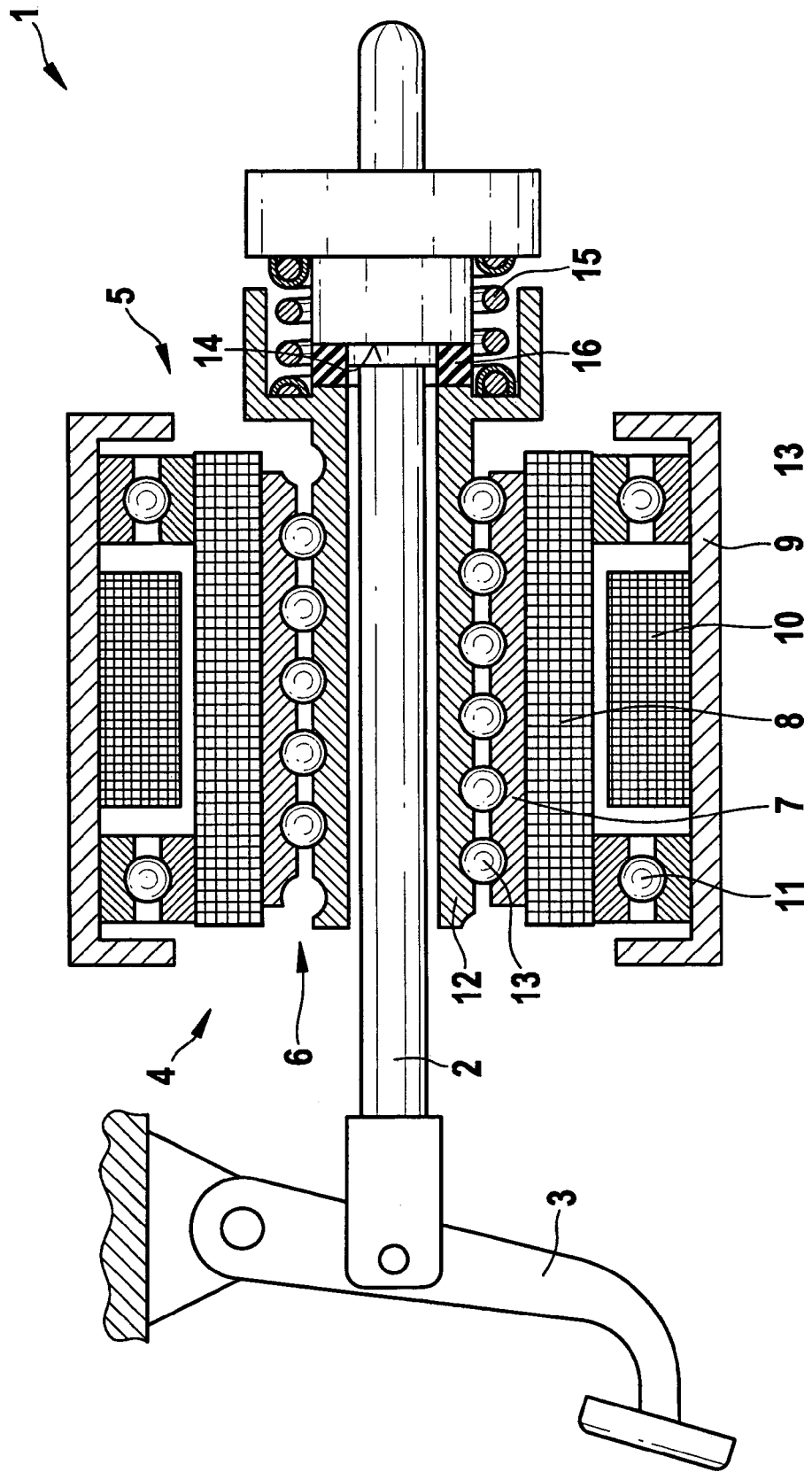

ELECTROMECHANICAL BRAKE BOOSTER

CROSS-REFERENCE TO RELATED APPLICATION

This application is a 35 USC 371 application of PCT/EP2009/052755 filed on Mar. 10, 2009.

BACKGROUND OF THE INVENTION

1. Field of the Invention

The invention relates to an electromechanical brake booster.

2. Description of the Prior Art

One such electromechanical brake booster is known from German Published Patent Application DE 103 27 553 A1. The known brake booster has a piston rod, which mechanically connects a brake pedal to a piston of a master cylinder. The term "piston rod" as used in terms of the invention should be understood in general to mean a connecting element which connects a brake pedal mechanically to a piston of a master cylinder, regardless of the shape of the connecting element, or in other words even if the shape of the connecting element is not reminiscent of a rod. Instead of a brake pedal, some other user control element for actuating a vehicle brake system by muscle power may be provided, such as a hand brake lever. The term "brake pedal" should be understood generally to mean a user control element of this kind. The piston rod of the known brake booster has a slaving means, which cooperates with a spindle of a helical gear. The spindle is a hollow spindle, and it concentrically surrounds the piston rod. A nut of the spindle drive is at the same time a rotor of an electric motor of the electromechanical brake booster. The electric motor having the spindle drive may be conceived of as an electromechanical auxiliary force generator, which when current is supplied exerts an auxiliary force via the slaving means on the piston rod, which increases an actuation force exerted by muscle power. If the brake pedal is stepped on hard in the event of rapid actuation of the brake, for instance in an emergency braking situation, the piston rod can lead ahead of the threaded spindle, and then the vehicle brake system is actuated exclusively by muscle power. A vehicle driver need not also accelerate the spindle and the spindle nut that is simultaneously the rotor of the electric motor.

ADVANTAGES AND SUMMARY OF THE INVENTION

The electromechanical brake booster of the invention has a piston rod and an electromechanical auxiliary force generator. As in the electromechanical brake booster already known from DE 103 27 553 A1, the auxiliary force generator can be an electric motor with a spindle drive or in general with a rotation/translation conversion gear, which has the rotary driving motion of the electric motor into a translational motion for displacing the piston rod. A step-down gear may be placed between the electric motor and the rotation/translation conversion gear. Other possibilities for the electromechanical auxiliary force generator are a linear motor, an electromagnet, or possibly a piezoelectric element, or in other words in general a device which converts electrical energy into mechanical energy. According to the invention, a power takeoff element of the auxiliary force generator is connected elastically, for instance by means of a spring element, to the piston rod. The power takeoff element is the translationally moved element of the auxiliary force generator; in the case of an electric motor with a spindle drive, it is accordingly the threaded spindle or the nut, if the spindle is driven to rotate and the nut is fixed against relative rotation but axially displaceable, and in the case of a linear motor or electromagnet, it is the armature thereof. The elastic connection need not be made directly at the piston rod; instead, it can also be made indirectly, for instance via the brake pedal or the piston of the master cylinder.

The invention has the advantage that upon rapid brake actuation, for instance in emergency braking, the piston rod can lead ahead of the power takeoff element of the auxiliary force generator; force transmission from the piston rod to the power takeoff element of the auxiliary force generator is reduced in comparison to a piston rod rigidly connected to the power takeoff element, and thus the muscle power that must be exerted by a vehicle driver upon a fast brake actuation is also reduced, since because of the elastic connection he does not have to accelerate the moving parts of the auxiliary force generator as strongly. Nevertheless, the vehicle driver does accelerate the moving parts of the auxiliary force generator via the elastic connection, so that the auxiliary force generator accelerates faster; for instance, an electric motor of the auxiliary force generator starts up faster.

It is possible to employ the electromechanical brake booster of the invention as an external force generator for actuating a vehicle brake system by external force, or in other words without muscle power on the part of the vehicle driver. Auxiliary braking in the event of failure of the auxiliary force generator or of its power supply or control/regulation is always possible. Auxiliary braking is emergency braking, as noted, in the event that the auxiliary force generator fails, and must not be mistaken for the auxiliary force braking in which some of the actuation force exerted to actuate the brake is exerted by the muscle power of the vehicle driver, and the rest of the actuation force is exerted by the auxiliary force generator. The auxiliary force braking is the intended brake actuation.

The invention will be described in further detail below in terms of an embodiment shown in the drawing. The sole drawing FIGURE shows an electromechanical brake booster of the invention in axial section.

EMBODIMENT OF THE INVENTION

The electromechanical brake booster 1 of the invention shown in the drawing has a piston rod 2, which connects a brake pedal 3 mechanically to a piston, not shown, of a master cylinder and transmits a muscle power, exerted by the brake pedal 3, to the piston of the master cylinder. The introduction of the muscle power can also be done with a hand brake lever or some other user control element (not shown), instead of the brake pedal 3.

The brake booster 1 has an electromechanical auxiliary force generator 4, which includes an electric motor 5 and a helical gear 6. The electric motor 5 is embodied as a hollow shaft motor; it concentrically surrounds the piston rod 2. A rotor 7 of the electric motor 5 is, as noted, embodied as a hollow shaft and carries the rotor windings 8 and concentrically surrounds the piston rod 2. The rotor 7 is concentrically surrounded by a stator 9 with stator windings 10. The rotor 7 is supported rotatably in the stator 9 by ball bearings 11. The construction of the electric motor 5 shown and described is not compulsory for the invention.

The rotor 7 embodied as a hollow shaft at the same time forms a nut of the helical gear 6; that is, the rotor 7 has a female thread. The helical gear 6 converts a rotary driving motion of the electric motor 5 into a translational motion for displacing the piston rod 2. In the embodiment of the invention shown and described, the helical gear 6 is embodied as a spindle drive, specifically as a ball screw. However, that is not compulsory for the invention, either. The helical gear 6 has a hollow spindle 12, which is disposed concentrically in the rotor 7 and which concentrically surrounds the piston rod 2. The spindle 12 has a thread which meshes via balls 13 with the female thread of the rotor 7. The threads of the rotor 7 and of the spindle 12 are helical ball races.

The piston rod 2 has a slaving means 14, which cooperates with the spindle 12. In the embodiment of the invention shown, the slaving means 14 is an annular step on the side near the piston, not shown, of the master cylinder, which side is oriented toward the brake pedal 3 and cooperates with the face end of the spindle 12 that is oriented toward the piston, not shown, of the master cylinder. A damper 16 is disposed on the piston rod 2, between the annular step of the piston rod 2 that forms the slaving means 14 and the face end of the spindle 12. The damper 16 is a rubber buffer; it takes the form of a rubber ring of rectangular cross section. Upon a brake actuation by stepping on the brake pedal 3, the electric motor 5 of the auxiliary force generator 4 is supplied with current, and as a result, the rotor 7 that forms the nut is driven to rotate, and the spindle 12 is displaced in an actuation direction, that is, in the direction of the piston, not shown, of the master cylinder. In this way, via the damper 16 and the slaving means 14, the auxiliary force generator 4 exerts an auxiliary force on the piston rod 2 that increases the muscle power exerted by means of the brake pedal 3. No control or regulation of the auxiliary force generator 4 is shown. With the auxiliary force generator 4, external force braking without muscle power actuation is also possible, in which the force for actuating the vehicle brake system is generated solely by the auxiliary force generator.

A spring element 15 connects the piston rod 2 elastically to the spindle 12. In the embodiment of the invention shown, the spring element 15 is a helical tension spring, one end winding of which is connected to the piston rod 2 and the other end winding of which is connected to the spindle 12. It is not compulsory to use a helical tension spring as the spring element 15; a helical compression spring or some other elastic element (not shown) may also be used. If for fast brake actuation, for instance in emergency braking or when driving in a sporty style, the brake pedal 3 is stepped on hard, the slaving means 14 embodied as an annular step can lift from the face end of the spindle 12, and the piston rod 2 can lead ahead of the spindle 12; that is, the piston rod 2 can move faster in the actuation direction than the spindle 12. As a result, in an instance of fast brake actuation, a vehicle driver need not also fully accelerate the moving parts of the auxiliary force generator 4, that is, the spindle 12 and the rotor 7 forming the nut; the electric motor 5 can start up more slowly than would correspond to the motion of the piston rod 2. The muscle power required for a fast brake actuation is reduced as a result. Because of the elastic connection of the piston rod 2 with the spindle 12 via the spring element 15, the vehicle driver nevertheless accelerates the spindle 12 and as a result facilitates and speeds up the startup of the electric motor 5.

If the auxiliary force generator 4 fails, brake actuation by muscle power is always possible by stepping on the brake pedal 3.

The helical gear 6 forms a rotation/translation conversion gear, which converts a rotary driving motion of the electric motor 5 into a translational motion for a brake actuation. The spindle 12 forms a power takeoff element of the auxiliary force generator 4. At an actuation speed that does not exceed an acceleration upon startup of the electric motor 5, the spindle 12 transmits the auxiliary force of the auxiliary force generator 4, without the elasticity of the spring element 15, to the annular step forming the slaving means 14 of the piston rod 2.

The damper 16 damps an impact of the spindle 12 on the slaving means 14, if after a fast brake actuation the spindle 12 "catches up" to the slaving means 14 of the piston rod 2 that has "raced ahead". As a result, an excessive increase in brake boosting and brake pressure by the accelerated auxiliary force generator 4 is reduced when the spindle 12 strikes the slaving means 14. Instead of the damper 16, in the released basic position of the brake booster 1, there can be a spacing between the face end of the spindle 12 and the slaving means 14. Then, the damping is effected by a compression of the spring element 15, or in other words an exertion of pressure on the spring element 15, before the spindle strikes the slaving means 14. The damping can also be omitted. In that case, the damper 16 is omitted, and the spindle 12, in the released basic position of the brake booster 1, rests on the slaving means 14. This makes prestressing of the spring element 15 possible, and the transmission of auxiliary force from the auxiliary force generator 4 to the piston rod 2 is effected without elasticity.

The invention claimed is:

1. An electromechanical brake booster, having:
   a piston rod for transmitting an actuation force from a brake pedal to a piston of a master cylinder; and
   an electromechanical auxiliary force generator with which an auxiliary force for boosting the actuation force can be generated, wherein a power takeoff element of the auxiliary force generator is directly connected to the piston rod by an elastic element, the elastic element configured to apply an elastic force to said power takeoff element to pull said power takeoff element toward said piston rod.

2. The electromechanical brake booster as defined by claim 1, wherein the elastic element is a spring element.

3. The electromechanical brake booster as defined by claim 2, wherein the brake booster has a slaving device which transmits the auxiliary force of the auxiliary force generator to the piston rod independent of the elastic element.

4. The electromechanical brake booster as defined by claim 3, wherein the auxiliary force generator has an electric motor and a rotation/translation conversion gear.

5. The electromechanical brake booster as defined by claim 2, wherein the auxiliary force generator has an electric motor and a rotation/translation conversion gear.

6. The electromechanical brake booster as defined by claim 2, wherein said spring element includes a helical spring with one end attached to said power takeoff element and an opposite end attached to said piston rod.

7. The electromechanical brake booster as defined by claim 1, wherein the brake booster has a slaving device which transmits the auxiliary force of the auxiliary force generator to the piston rod independent of the elastic element.

8. The electromechanical brake booster as defined by claim 7, wherein the auxiliary force generator has an electric motor and a rotation/translation conversion gear.

9. The electromechanical brake booster as defined by claim 1, wherein the auxiliary force generator has an electric motor and a rotation/translation conversion gear.

10. An electromechanical brake booster, having:
    a piston rod for transmitting an actuation force from a brake pedal to a piston of a master cylinder;
    an electromechanical auxiliary force generator with which an auxiliary force for boosting the actuation force can be generated, wherein a power takeoff element of the auxiliary force generator is directly connected to the piston rod by an elastic element, wherein the brake booster has a slaving device which transmits the auxiliary force of the auxiliary force generator to the piston rod independent of the elastic element, and wherein the brake booster has a damper which damps a motion of the auxiliary force generator when the damper comes into contact with the slaving device.

11. The electromechanical brake booster as defined by claim 10, wherein the auxiliary force generator has an electric motor and a rotation/translation conversion gear.

12. An electromechanical brake booster, having:
a piston rod for transmitting an actuation force from a brake pedal to a piston of a master cylinder;
an electromechanical auxiliary force generator with which an auxiliary force for boosting the actuation force can be generated, wherein a power takeoff element of the auxiliary force generator is directly connected to the piston rod by an elastic element,
wherein the elastic element is a spring element,
wherein the brake booster has a slaving device which transmits the auxiliary force of the auxiliary force generator to the piston rod independent of the elastic element, and
wherein the brake booster has a damper which damps a motion of the auxiliary force generator when the damper comes into contact with the slaving device.

13. The electromechanical brake booster as defined by claim 12, wherein the auxiliary force generator has an electric motor and a rotation/translation conversion gear.

14. An electromechanical brake booster, having:
a piston rod for transmitting an actuation force from a brake pedal to a piston of a master cylinder;
an electromechanical auxiliary force generator with which an auxiliary force for boosting the actuation force can be generated, the auxiliary force generator including a power takeoff element operable to transmit the auxiliary force;
a slaving element disposed between said piston rod and said power takeoff element configured to directly transmit the auxiliary force to said piston rod only when said slaving element is in contact with said power takeoff element; and
a connection element directly connected between said power takeoff element and said piston rod and configured to generate an elastic force between said power takeoff element and said piston rod to pull said power takeoff element toward said piston rod when said slaving element is not in contact with said power takeoff element.

15. The electromechanical brake booster as defined by claim 14, wherein said connection element is a spring.

16. The electromechanical brake booster as defined by claim 15, wherein said spring is a helical spring having one end attached to said piston rod and an opposite end attached to said power takeoff element.

17. The electromechanical brake booster as defined by claim 14, wherein:
said slaving element includes an annular step defined on said piston rod; and
said power takeoff element includes a spindle arranged to contact said annular step to transmit the auxiliary force.

18. An electromechanical brake booster, having:
a piston rod for transmitting an actuation force from a brake pedal to a piston of a master cylinder;
an electromechanical auxiliary force generator with which an auxiliary force for boosting the actuation force can be generated, the auxiliary force generator including a power takeoff element operable to transmit the auxiliary force;
a slaving element disposed between said piston rod and said power takeoff element configured to directly transmit the auxiliary force to said piston rod only when said slaving element is in contact with said power takeoff element; and
a connection element directly connected between said power takeoff element and said piston rod and configured to generate an elastic force between said power takeoff element and said piston rod when said slaving element is not in contact with said power takeoff element, and
further comprising a damper disposed between said slaving element and said power takeoff element.

19. The electromechanical brake booster as defined by claim 18, wherein:
said connection element is a tension spring; and
said damper is configured to pre-stress said tension spring.

* * * * *